(12) United States Patent
Tamir et al.

(10) Patent No.: US 8,482,612 B2
(45) Date of Patent: Jul. 9, 2013

(54) SYSTEM AND METHOD FOR LOCATION TRACKING (75) Inventors: Michael Tamir, Tel Aviv (IL); Gal Oz, Kfar Saba (IL)

(73) Assignee: Stats LLC, Northbrook, IL (US)

( * ) Notice: Subject to any disclaimer, the term of this patent is extended or adjusted under 35 U.S.C. 154(b) by 413 days.

(21) Appl. No.: 12/843,052

(22) Filed: Jul. 26, 2010

(65) Prior Publication Data
US 2011/0032361 A1 Feb. 10, 2011

Related U.S. Application Data (60) Provisional application No. 61/232,478, filed on Aug. 10, 2009.

(51) Int. Cl.
*H04N 13/02* (2006.01)
*H04N 7/18* (2006.01)

(52) U.S. Cl.
USPC .............. 348/157; 348/46; 348/158; 348/159

(58) Field of Classification Search
USPC ............................................ 348/46, 157, 159
See application file for complete search history.

(56) References Cited

U.S. PATENT DOCUMENTS

| 4,775,946 | A * | 10/1988 | Anjyo ............................. 345/419 |
| 2007/0146372 | A1 * | 6/2007 | Gee et al. ........................ 345/474 |
| 2007/0279494 | A1 * | 12/2007 | Aman et al. .................... 348/169 |
| 2008/0219509 | A1 * | 9/2008 | White et al. .................... 382/107 |
| 2009/0141941 | A1 * | 6/2009 | Wagg ............................. 382/103 |

* cited by examiner

*Primary Examiner* — David Lazaro
*Assistant Examiner* — Farzana Huq
(74) *Attorney, Agent, or Firm* — Mark M. Friedman (57) ABSTRACT

It is provided a system for embedment within a sport playing object, a ball for example. The system is associated with continuous determination of a state of the object, its location and pose. The system includes an inertial navigation system (INS) module first state module adapted for measuring parameters associated with the object state, a wireless transmitter, a battery for providing electric power, and a mounting module connecting the object with the first state module, the wireless transmitter and the battery. Independent data relating to the object state is provided by a second state module, a camera system for example. The object state is calculated in accordance with the parameters measured by the first state module and in accordance with the independent provided data. The camera system capturing the object includes at least two mutually displaced camera clusters, and each camera cluster includes one or more cameras for providing a predetermined spatial resolution. The system may include a global positioning system (GPS) module which provides the independent data relating to the object state.

47 Claims, 5 Drawing Sheets

SYSTEM AND METHOD FOR LOCATION TRACKING

CLAIM OF PRIORITY

This application claims the benefit of provisional U.S. application Ser. No. 61/232,478 entitled "SYSTEM AND METHOD FOR LOCATION TRACKING" by the present inventors, filed Aug. 10, 2009.

BACKGROUND OF THE INVENTION

1. Field of the Invention

The invention is in the field of sports TV shows and display, especially in the field of online tracking of ball and players in football games.

2. Description of Related Art

In ball games, the viewer attention is divided between a ball and the players manipulating the ball in certain ways along the game rules. The ball is a small object relative to the players and a tiny object relative to the size of the playing field or even a substantial portion of the playing field. Moreover, at times the ball is totally occluded from part or all the viewers and TV spectators by the bodies of the players, for example. Thus, there is a need to present the ball position or location and possibly the ball pose to viewer. In addition, a systematic determination of the ball position may enable several applications of interest for viewers and game analysts, like online and off-line presentation of the ball orbit along certain time interval, including occlusion periods, accumulation and presentation of statistical data relating to the ball, etc.

There is a need to track an object in other fields as well, the security and police fields for example. Thus, a system applicable for the sports field, may be used for those fields as well.

It is an objective of the present invention to enable continuous tracking of the football during an entire match, lasting about four hours. Additional objective is to track simultaneously several identified balls, each with its own location details. The desired system should function in open as well as close arenas, and get ball position accuracy within 5 cm, preferably within 1 cm, in update rate of 5-30/sec, preferably 10-20/sec, at a variety of environmental conditions, including rainfall and snow.

BRIEF SUMMARY OF THE INVENTION

It is provided according to some embodiments of the present invention, a system for embedment within a sport playing object, which system is associated with continuous determination of a state of the object. The object state includes a location of the object and preferably also its pose. The system includes a first state module measuring parameters associated with the object state, a wireless transmitter for communicating the first state module to a wireless receiver, a battery for providing electric power, and a mounting module connecting the object with the first state module, the wireless transmitter and the battery. Thus, the center of mass of the system is kept substantially at a predetermined position relative to the center of mass of the object. Preferably, the two centers of mass substantially coincide.

Additional data relating to the object state is provided by a second state module, and the object state is calculated in accordance with the parameters measured by the first state module and in accordance with the provided data.

Preferably, the sport playing object is a football, a soccer ball, a tennis ball, a golf ball or a hockey ball.

In some embodiments, the system includes an inertial navigation system (INS) module. Preferably, the system also includes a wireless transceiver for communicating the first state module with a transceiver using ZigBee specification.

In some embodiments, the system includes a rechargeable battery and an interface for connecting the rechargeable battery to an external power supply, or to means for converting kinetic energy of the object to electric energy.

In some embodiments, the second state module is a camera system capturing the object. Preferably, the camera system includes at least two mutually displaced camera clusters, and each camera cluster includes one or more cameras for providing a predetermined spatial resolution.

In some embodiments, the system includes a global positioning system (GPS) module which provides the additional data relating to the object state. The global positioning system module may be linked to three or more pseudolites.

In some embodiments, the system further includes a micro-electromechanical altitude sensor, a microphone and/or a camera for providing a viewpoint of the object.

It is provided, according to some embodiments of the present invention, an orbit processor for tracking a state of an object. The processor is associated with two or more mutually displaced camera clusters capturing images of the object. The processor includes means for receiving data from an INS module connected to the object, and main processing unit. The received data is associated with determination of the object state. The unit is adapted for determining the object state at certain time using data associated with images captured by the cameras, and for calculating subsequent object states. In this calculation, the unit is using the determined object state at certain time as an initial state and is using the received INS data to further follow the object state.

In some embodiments, the object is a sport ball.

In some embodiments, a camera cluster incorporates a span of at least 10,000 horizontal pixels.

In some embodiments, the orbit processor calibrates the cameras in accordance with data relating to landmarks associated with the object.

In some embodiments, the orbit processor includes a statistics generation module for accumulating data on the object state over time. It also includes an operator interface connected to a graphic user interface for a human operator, to a transceiver for communicating with the INS module, to the main processor unit, and to a broadcasting interface for outputting the object state. Preferably, the orbit processor also includes a display module for presenting the object state and object orbits, and a broadcasting interface for outputting the object state for external presentation.

It is provided according to some embodiments of the present invention, a method for tracking a state of an object. Images of the object are captured by two or more mutually displaced camera clusters, each camera cluster including one or more cameras. Data associated with the object state is provided by an INS module connected to the object. The method includes determining the object state at certain time using data derived from images captured by the cameras, and calculating subsequent object states using the determined object state at certain time as an initial state, and using data received from the inertial navigation module to further follow the object state.

In some embodiments, a global positioning system module is connected to the object and the method further includes the step of using data provided by the global positioning system module for determining the object state at certain time.

In some embodiments, the method further includes the step of using object height data provided by an altitude sensor for controlling operation of other sensors.

In some embodiments, the calculating subsequent object states provides object location in a better than a 5 cm accuracy, and at a maximal repetition rate of at least 5 times per second, preferably better than a 1 cm accuracy at a maximal repetition rate of at least 30 times per second.

In some embodiments, the method further includes the steps of calibrating the cameras in accordance with known landmark, accumulating statistical data on the object state over time, operating a graphic user interface for controlling a transceiver communicating with the inertial navigation module, the main processor unit, and the broadcasting interface for outputting the object state. The method may also include the steps of presenting the object state and object orbits, and outputting the object state for external presentation.

It is provided according to some embodiments of the present invention, a method for a system embedded within a sport playing object. The method includes providing a first state module adapted for measuring parameters associated with the object state, communicating the first state module to a wireless receiver, providing electric power to the first module, and switching the first state module in accordance with control signals.

In some embodiments, the method includes charging a rechargeable battery for providing electric power to the first state module.

In some embodiments, the method includes providing data relating to the object state by a global positioning system module (GPS). Preferably, the GPS module is linked to three or more pseudolites and the method includes transmitting signals to the pseudolites for determining a location of the object.

In some embodiments, the system includes a micro-electromechanical altitude sensor, and the method further includes using height data to control operation of the first state module.

In some embodiments, the system includes a microphone and the method further includes transmitting acoustic signals provided by the microphone to a wireless receiver. Similarly, the system may include a camera and the method includes providing images reflecting a viewpoint of the object.

It is provided according to some embodiments of the present invention, a system for embedment within a sport playing object. The system includes sensors for providing signals received in proximity to the object, a microphone and a camera for example, a wireless transmitter for communicating the signals to at least one wireless receiver, a battery for providing electric power, and a mounting module connecting the object with one or more sensors, such that the center of mass of the system is kept substantially at a predetermined position relative to the center of mass of the object.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

DETAILED DESCRIPTION OF THE INVENTION

The present invention will now be described in terms of specific example embodiments. It is to be understood that the invention is not limited to the example embodiments disclosed. It should also be understood that not every feature of the methods and systems handling the described device is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

Figure 1:
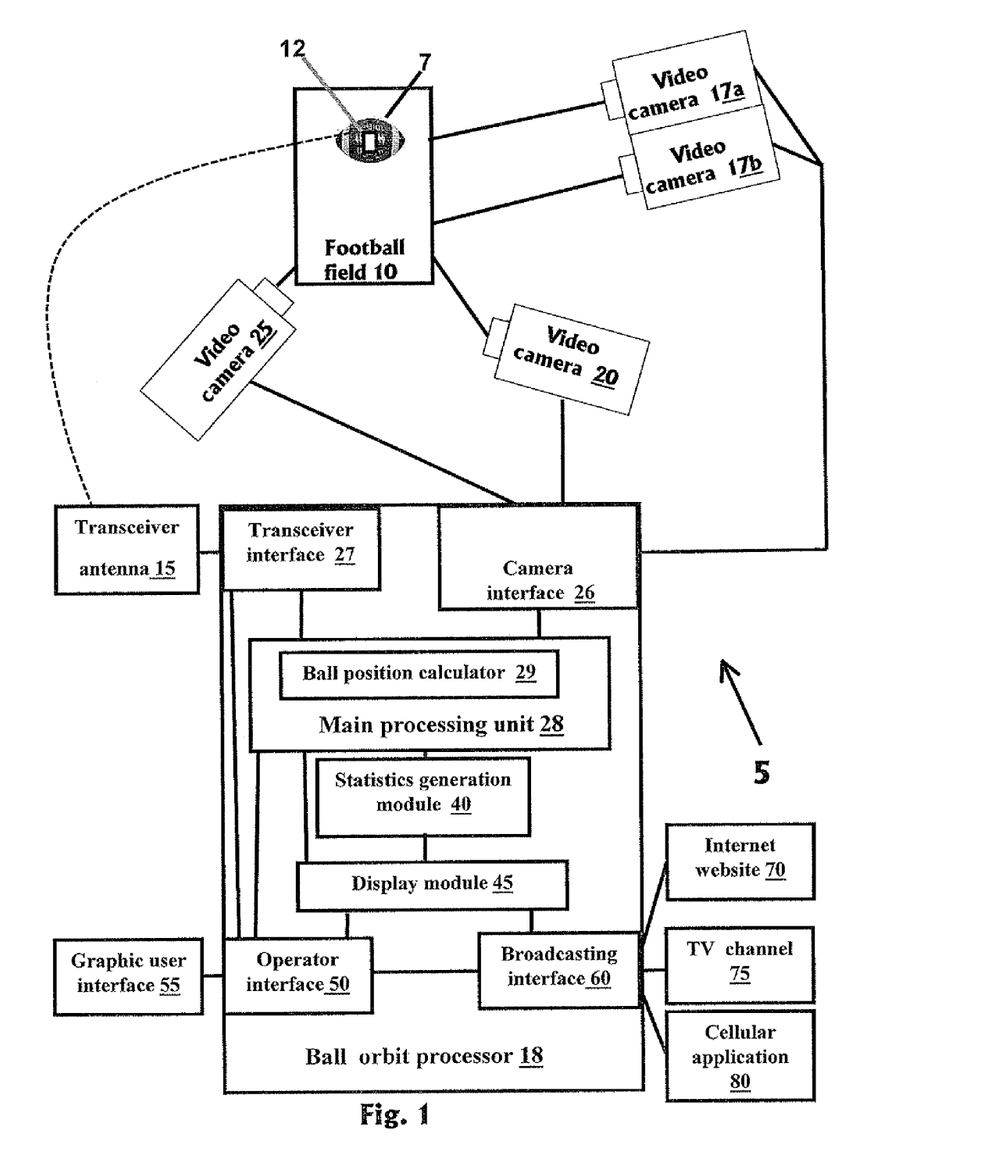
FIG. 1 is a block diagram of a system for tracking a sport playing object having a ball orbit processor.

A system 5 for tracking a football 7 located within in a football field 10 is depicted in the block diagram of FIG. 1. The ball carries an embedded system 12 for delivering data on the ball state to a transceiver antenna 15, which in turn is connected to a ball orbit processor 18.

Additional data on the ball state is collected by a camera system capturing the football field from two or more viewpoints. In the example of FIG. 1, the camera system includes three camera clusters, the first cluster includes camera 17a and camera 17b side by side such that they span a broad horizontal range with excellent spatial resolution. For example, in order to achieve a ball location accuracy of few centimeters, a cluster of cameras should have ~10,000 horizontal pixels. Such requirement may be realized for example by means of five 3MegaPixels cameras (of which only two are shown) mounted side by side.

The other clusters have each a single camera, 20 and 25, respectively. The cameras are connected to a camera interface 26 of ball orbit processor 18 either over ground cables or wirelessly.

Ball orbit processor 18 includes transceiver interface 27 which is linked to transceiver antenna 15 for receiving data from an INS module included in embedded system 12. The received data is associated with determination of the object state. It also includes a main processing unit 28. Unit 28 includes a ball position calculator 29, which determines the ball state at certain time using data derived from images captured by the cameras, and calculates subsequent object states. In this calculation, calculator 29 uses the object state at certain time as determined by the derived data as an initial state, and uses the received INS data to further follow the object state. Ball position calculation and future prediction from the INS data is done by an integral over time performed separately on X,Y,Z axes, taking into account rotations as measured by three dimensional (3D) gyroscopes of the INS. The algorithm uses a Kalman Filter as a recursive linear filter for the measured discrete raw data.

The function of the camera system is to detect and localize ball 7 in three dimensions when the ball is visible to the cameras. The ball detection may be performed every frame, 30 or 60 times a second. One needs at least two cameras to independently detect the ball in a given frame, so that the ball location can be determined as the crossing point of two lines of sight. For the sake of redundancy it is better to use three or four independent camera modules or clusters deployed around the playing field as illustrated in FIG. 1.

The main elements of a camera detection algorithm are:
(a) A parallel approach composed of dynamic background subtraction, ball motion detection, and ball tracking using former frames' data and other metrics.
(b) In every new frame a ball location prediction is first made based on the accumulated ball INS data (given more weight if the ball has been occluded in the previous frames), and then camera calculation of the ball's location and its last speed vector.
(c) During setup, ball orbit processor 18 calibrates the cameras in accordance with data on football field landmarks. Thus, the camera modules are spatially calibrated to world coordinates using the field lines or measured landmarks on the playing field. Lens distortions should also be accounted for.

There are two main implementations of the proposed camera system. The first is based on clusters of fixed cameras covering the entire pitch. The second is using a single camera mounted on a fast moving pan and tilt unit in each camera cluster. The first method does not comprise moving parts and is therefore more robust and can use the dynamic background subtraction more reliably, and is also easier to calibrate. On the other hand, the second method will afford better resolution.

Ball orbit processor 18 includes a statistics generation module 40 for accumulating data on the object state over time. It also includes an operator interface 50 connected to a graphic user interface 55 for a human operator, to transceiver interface 27, to the main processor unit 28, and to a broadcasting interface 60 for outputting the object state. Ball orbit processor 18 also includes a display module 45 for presenting the object state and object orbits. The location data may be used for accumulating and presenting location statistics to viewers, analysts, and broadcasters, and for showing a location cursor on screen whenever the ball is not seen optically.

Broadcasting interface 60 outputs the ball orbit and statistics to a variety of receivers, internet websites 70, TV channels 75, and cellular applications 80, for example. A viewer in the field may hold a cellular touch screen device like IPHONE™ or IPAD™ and may use a suitable application for observing the ball position whenever ball 7 is occluded due to the seat location or obscuring player bodies.

Figure 2:
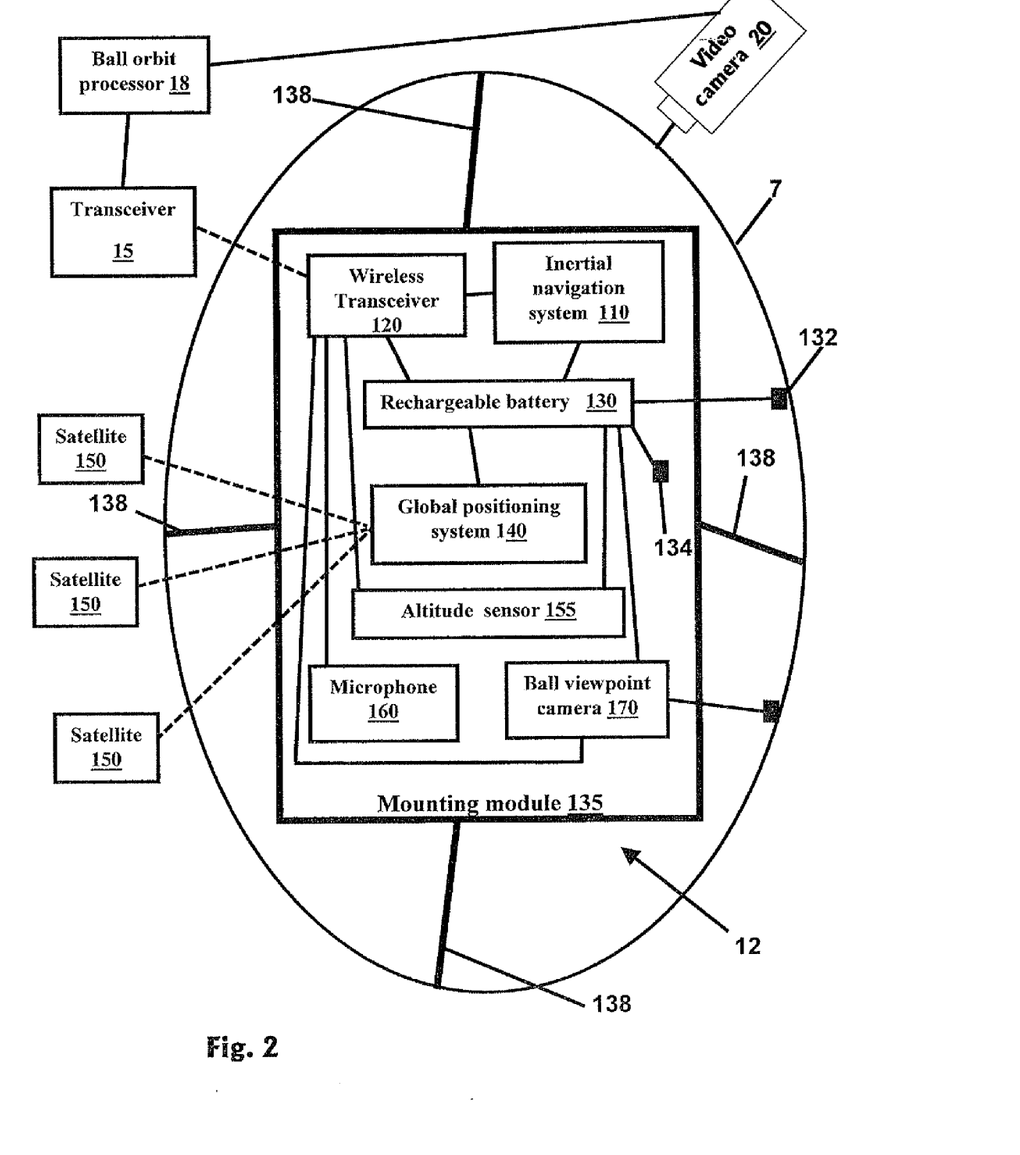
FIG. 2 is a schematic drawing of a ball including an embedded system for determining the ball location.

Referring now to FIG. 2, it illustrates system 12 for embedment within a sport playing object 7, which system 12 is associated with continuous determination of a state of the object. The object state includes a location of object 7 and preferably also its pose. System 12 includes an INS module 110 for measuring accelerations of object 7 in three directions X, Y and Z, and rotations around three axes. System 12 also includes a wireless transceiver 120 for communicating INS module 110 to wireless transceiver 15, a rechargeable battery 130 for providing electric power, and a mounting module 135 connecting the ball with the first state module, the wireless transmitter and the battery. Mounting module 135 includes a frame and springs or strips 138 attached to ball 7. Thus, the center of mass of system 12 is kept substantially as a suspension at a predetermined position relative to the center of mass of object 7. Preferably, the two centers of mass substantially coincide. Consequently, any changes in the ball mass distribution as well as its rotational specifications are prevented.

INS module 110 transmits the instantaneous six accelerations and rotations of ball 7 to remote ball orbit processor 18 which in turn calculates the ball current position in space. The INS component is composed of three three-dimensional micro-electromechanical (MEMS) accelerometers and gyroscopes packaged in a small (less than 1 sq. inch) entity. Low-cost, micro machined, inertial sensors have been steadily emerging into the commercial marketplace. The component used in one embodiment of the current invention is Analog Devices ADXL202. Some of these commercial off-the-shelf sensors are used in military applications, especially guidance of smart munitions. Artillery projectiles and rockets, instrumented with commercially available low-cost micro-electromechanical systems (MEMS) accelerometers, spin sensors, and custom telemetry units, have been flight tested with good success.

The proposed ball position measurement is based on dead reckoning (DR), the process of estimating an object's current position based upon a previously determined position, and advancing that position based upon known or estimated accelerations and speeds over elapsed time and orbit. A disadvantage of dead reckoning is that since new positions are calculated solely from previous positions, the errors of the process are cumulative, so the error in the measured ball position grows with time. The best usage of a dead reckoning system, and an INS module 110 in particular, is therefore when integrated with an independent position measurement system that can be used to periodically calibrate the DR system and actually reset the accumulated position drift. One such a potential system is a global positioning system (GPS) receiver module 140 also embedded within ball 7. Another system is an external camera system measuring the ball position when it is visible to at least two camera clusters, as described above.

A camera system based method is preferred over GPS based method in view of the following reasons:
(a) Available GPS receivers are too bulky for system 12.
(b) Current GPS accuracy is not sufficient.
(c) GPS is ineffective in covered arenas.

In order to calculate the INS evolving position drift, it is essential to perform a study of the statistics of "line-of-sight exposure for at least two cameras" versus "invisible ball" situations. The parameters that dictate the evolving error are time and the dynamics pattern of the ball during the occluded period. The primary assumption is that such occlusion periods are typically shorter than 8-10 seconds. According to those crude estimates the accumulated error developing in such a time period are less than 10 cm.

Selecting the optimal MEMS components and calculating the INS performance is based on responsivity, saturation, resistance and eventual drift. The main parameters to evaluate are size/weight, cost, g-range, temperature drift, sensitivity, noise, resolution, environmental resistance and supply voltage. Preliminary estimates of the INS package size are much smaller than a cubic inch.

As mentioned, GPS solution based on receiving signals from satellites 150 is limited to open arenas and is inefficient in a closed stadium, and it also has a limited accuracy. To overcome those constraints, GPS pseudo-satellites (pseudolites) 150 may be used. Pseudolites 150 are signal generators deployed on the ceiling of the arena transmitting GPS-like signals to nearby users mimicking GPS satellites emitters. In this way, GPS navigation is enabled in an indoor environment like a close arena and it can produce a much better position accuracy. A centimeter-accuracy can be achieved using asynchronous pseudolites. Pseudolites 150 may be used in a reversed mode, in which UPS module 140 transmits a signal and pseudolites 150 receive it, and the accurate location is calculated in the ball orbit processor 18 from three or more signals received by pseudolites 150.

Preferably, the ball telemetry and the communicating of system 12 with ball orbit processor 18 is based on Zigbee protocols and communication modules. ZigBee is a specification for a suite of high level communication protocols using small, low-power digital radios based on the IEEE 802.15.4-2003 standard for wireless personal area networks (WPANs), such as wireless headphones connecting with cell phones via short-range radio. The technology defined by the ZigBee specification is intended to be simpler and less expensive than other WPANs, such as Bluetooth. ZigBee is targeted at radio-frequency (RF) application that requires a low data rate, long battery life, and secure networking.

A typical message transmitted from INS module 110 to ball orbit processor 18 includes ball identification, three dimension accelerations as read by the accelerometers and three gyros' rotations. The transmission frequency is determined in accordance with the required performance, especially position accuracy, and available power. In case a power on/off strategy is taken, a duplex communication channel is enabled by transceivers 15 and 120.

Regarding rechargeable battery 130, the preliminary estimated power consumed by all the modules embedded into the ball is ~500 mw. The assumed continuous operation period is four hours. A cell phone's rechargeable battery may be used as a rechargeable battery 130, requiring a small charging plug 132 on the surface of ball 7. To decrease the ball power consumption and thus reduce the battery's size and weight, the ball kinetic energy may be converted to electric power charging the battery or directly the other components of system 12. The kinetic to electric conversion is done in a module 134 which is connected to rechargeable battery 130.

Preferably, the management of the battery consumption makes use of low voltage, low transmission frequency, and switching off most of the power during the time periods when ball 7 is visible to the camera system.

In some embodiments, the system further includes a microelectromechanical (MEMS) altitude sensor 155, a microphone 160 and/or a camera 170 for providing a viewpoint of ball 7. MEMS altitude sensor 155 measures the ball height above ground as an additional position data, as a trigger for the camera system indicating that ball 7 is high enough to be visible to the cameras, and/or as a power on/off automatic decision cue. Hidden microphone 160 may bring sounds from the playing field to the sport event spectators. Also, a video camera capturing the ball viewpoint may produce a unique viewers experience. Note that transmission of the captured images requires a high transmission bandwidth proportional to the image repetition rate.

Figure 5:
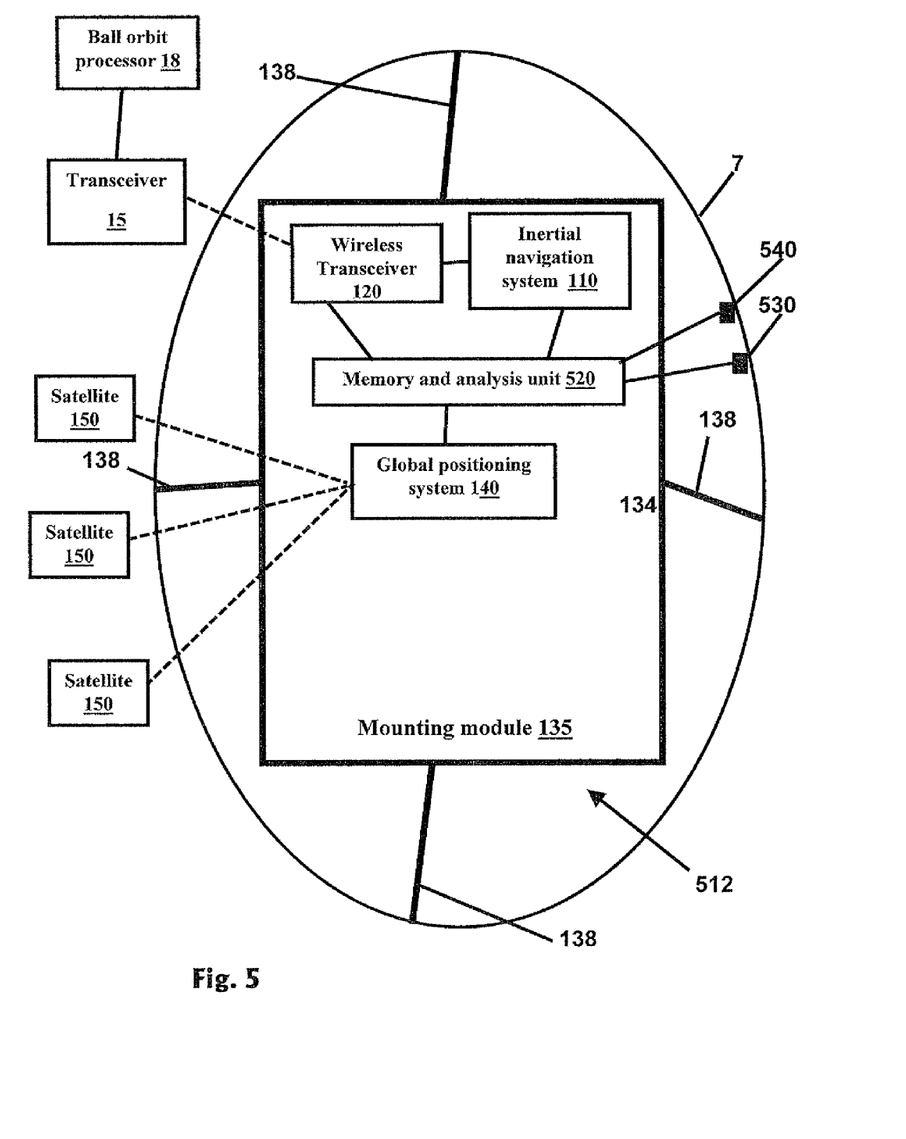
FIG. 5 is a schematic drawing of a ball including INS module for measuring location and rotation rate of a ball and a memory and analysis unit for storing data and communicating ball status.

Referring now to FIG. 5, a memory and analysis unit 520 is connected to INS module 110. At time of ball occlusion, wireless transmitting of ball state may be unavailable, and rather than being transmitted is stored in unit 520. After 5-10 seconds, for example, wireless transmission becomes available, and the stored data is transferred from memory unit 520 to ball orbit processor 18 through wireless transceiver 120 and transceiver 15, in a burst of data.

Figure 3:
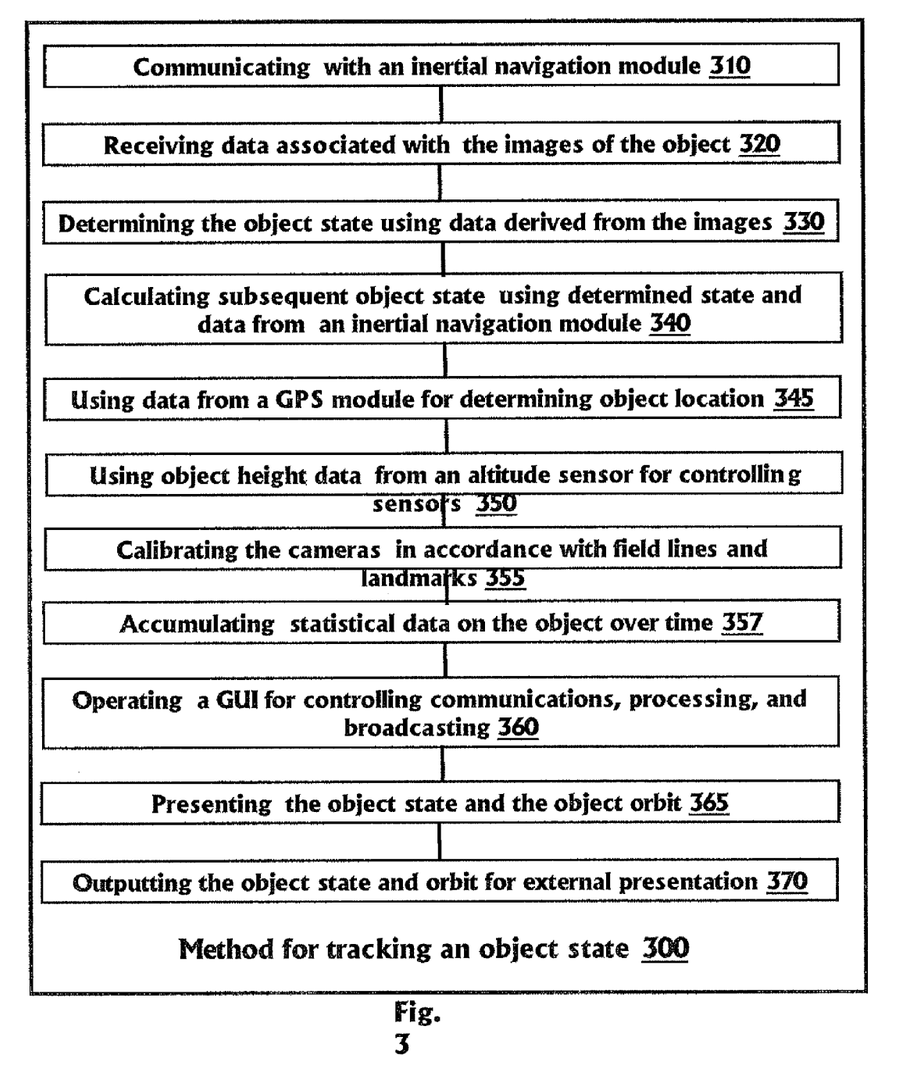
FIG. 3 is a flow chart of a method for tracking an object state.

FIG. 3 is a flow chart of a method 300 for tracking a state of an object 7. Images of object 7 are captured by two or more mutually displaced camera clusters. Data associated with the object state is provided by an INS module 110 connected to object 7. Method 300 includes a step 310 of communicating with INS module 110, a step 320 of receiving data associated with the images, a step 330 of determining the object state at certain time using data derived from the images, and a step 340 of calculating subsequent object states using the determined object state at certain time as an initial state, and using data received from the INS module 110 to further follow the object state.

In some embodiments, a GPS module 140 is connected to object 7 and method 300 further includes a step 345 of using data provided by GPS module 140 for determining the object state at certain time.

In some embodiments, method 300 further includes the step 350 of using object height data provided by an altitude sensor for controlling operation of the INS module 110 or camera system.

In some embodiments, the calculating subsequent object states provides object location in a better than a 5 cm accuracy, and at a maximal repetition rate of at least 5 times per second, preferably better than a 1 cm accuracy at a maximal repetition rate of at least 30 times per second.

In some embodiments, method 300 further includes a step 355 of calibrating the cameras in accordance with known landmarks, a step 357 of accumulating statistical data on the object state over time, a step 360 of operating a graphic user interface (GUI) for controlling a transceiver 15 communicating with the INS module, with main processor unit 28, and with broadcasting interface 60 for outputting the object state. Method 300 may also include a step 365 of presenting the object state and object orbits, and a step 370 of outputting the object state for external presentation.

Figure 4:
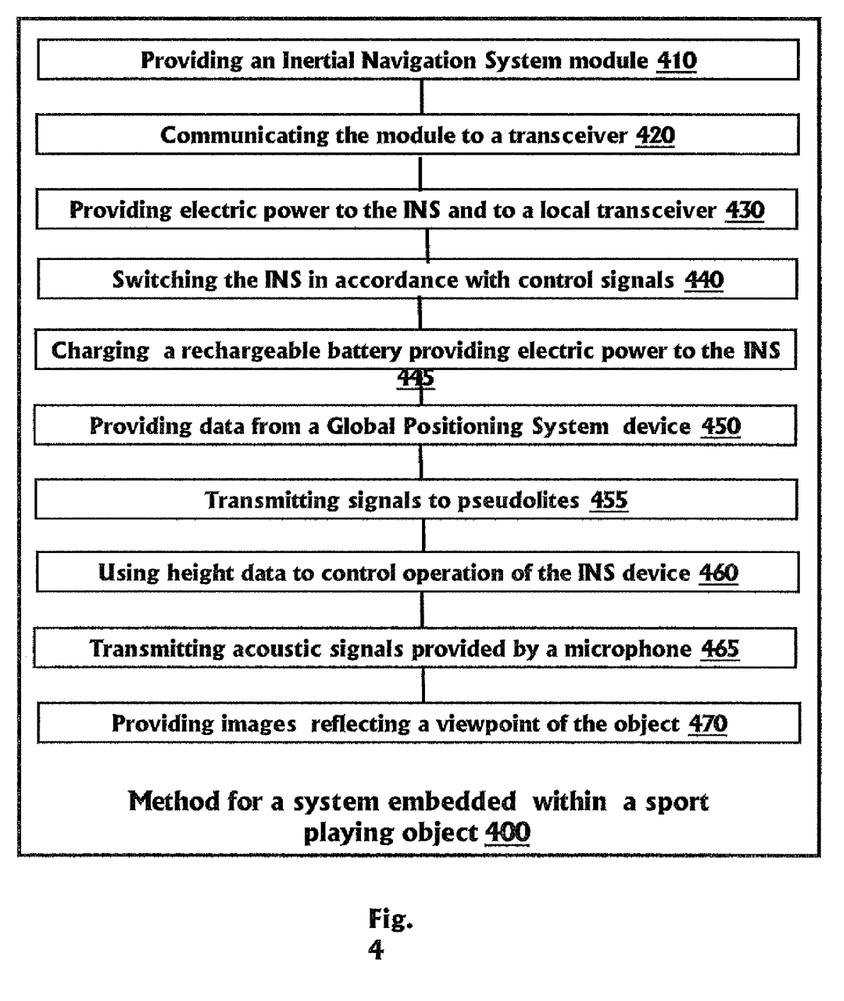
FIG. 4 is a flow chart of a method for a system embedded within a sport playing object.

Referring now to FIG. 4, a method 400 for a system 12 embedded within a sport playing object 7 is illustrated by a flow chart. Method 400 includes a step 410 of providing an INS module 110 measuring parameters of the object state, a step 420 of communicating the INS module 110 to a wireless receiver 15, a step 430 of providing electric power to INS module 110, and a step 440 of switching the INS in accordance with control signals.

In some embodiments, method 400 includes a step 445 of charging a rechargeable battery for providing electric power to INS module 110.

In some embodiments, method 400 includes a step 450 of providing data relating to the object state by a GPS module 140. Preferably, the GPS module is linked to three or more pseudolites 150 and method 400 includes a step 455 of transmitting signals to pseudolites 150 for determining a location of the object.

In some embodiments, system 12 includes a micro-electromechanical altitude sensor, and method 400 further includes a step 460 of using height data to control operation of INS module 110.

In some embodiments, system 12 includes a microphone 160 and method 400 further includes a step 465 of transmitting acoustic signals provided by microphone 160 to a wireless receiver 15. Similarly, system 12 may include a camera 170 and method 400 includes a step of providing images reflecting a viewpoint of object 7.

A spin measuring system 512 is illustrated in FIG. 5, preferably for use within an American football which is a non-spherical playing object. To some extent, the spin rate or rotation rate may be determined by a player and has certain effect on the object speed. The effect was studied by Watts and Moore in "The drag force on an American football" appeared in American J. of Physics vol. 71, page 791, 2003. They found a reduction of the drag force due to ball spinning. Such a reduction enhances the speed relative to a non-spinning ball, depending on the relative directions of motion and rotation axis. Thus, measuring the spin rate and delivering some data regarding the spin rate may be attractive for both training phase and an actual game. For that aim system 512 includes an INS module 110, an analysis unit 520 and a signal generator, a light emitting diode (LED) 530 or an acoustic generator (loudspeaker) 540.

In use, INS module 110 measures the rotation rate of the ball, analysis unit 520 compares the measured rotation rate to predetermined operational range, taking into account the moving direction and the rotation axis and emits a signal accordingly. For example, suppose that a desired result is that a spin-rate in the range 8-12 revolutions per seconds around a long axis of the ball when the ball propagates in a direction vertical to the long axis. Then, once the rotation rate fulfills that criterion, the LED turned on or flashes, and the loudspeaker emits a series of beeps.

The present invention may be used for tracking objects in other fields. For example, it may be used in tracking small robotic devices in police or military service.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. A system for embedment within a sport playing object, the system being associated with continuous determination of a state of the object, the object state including at least a location of the object, the system comprising:
   (a) a first state module adapted for measuring one or more parameters associated with the object state said first state module being selected from a group of modules consisting of an inertial navigation module, a global positioning system and a micro-electromechanical altitude sensor;
   (b) a wireless transmitter for communicating said first state module to at least one wireless receiver;
   (c) a battery for providing electric power to at least one of said first state module and said at least one wireless transmitter; and
   (d) a mounting module connecting said object with at least said first state module, the wireless transmitter and said battery, the center of mass of the system being kept substantially at a predetermined position relative to the center of mass of the object;
   whereby data relating to said object state being provided by a second state module, and the object state being calculated in accordance with the parameters measured by said first state module and in accordance with the provided data wherein the second state module being a camera capturing the sport playing object.

2. The system of claim 1 wherein the sport playing object is a ball of a sport selected from the group of sports consisting of football, soccer, tennis, golf, and hockey.

3. The system of claim 1 wherein said object state further includes a pose of the object.

4. The system of claim 1 wherein the system includes an inertial navigation module.

5. The system of claim 1 wherein the system includes a wireless transceiver for two way communicating said first state module with at least one transceiver.

6. The system of claim 5 wherein said wireless transceiver communicates using ZigBee specification.

7. The system of claim 1 wherein the system includes an interface for connecting said battery to an external power supply for charging said battery.

8. The system of claim 1 wherein the system includes means for converting kinetic energy of said object to electric energy for charging said battery.

9. The system of claim 1 wherein the second state module is a camera system capturing said object.

10. The system of claim 9 wherein said camera system includes at least two mutually displaced camera clusters, each camera cluster including one or more cameras for providing a predetermined spatial resolution.

11. The system of claim 1 wherein the system includes a global positioning system module providing said data relating to said object state.

12. The system of claim 11 wherein said global positioning system module is linked to three or more pseudolites.

13. The system of claim 1 wherein the system further includes a micro-electromechanical altitude sensor.

14. The system of claim 1 wherein the system further includes a microphone.

15. The system of claim 1 wherein the system further includes a camera for providing a viewpoint of said object.

16. The system of claim 1 wherein the system further includes a memory unit for storing data provided by at least said first state module, thereby the provided data is stored while wireless transmission of data is unavailable and is communicated once wireless transmission becomes available.

17. An orbit processor for tracking a state of an object, the object state including at least a location of the object, the processor being associated with two or more mutually displaced camera clusters capturing images of the object, each camera cluster including one or more cameras, the processor comprising:
   (a) means for receiving data from an inertial navigation module connected to the object, the received data being associated with determination of the object state; and
   (b) a main processing unit adapted for:
      (i) determining the object state at certain time using data associated with images captured by the cameras; and
      (ii) calculating subsequent object states using the determined object state at certain time as an initial state and using data received from said inertial navigation module to further follow the object state.

18. The orbit processor of claim 17 wherein the object state further includes a pose of the object.

19. The orbit processor of claim 17 wherein the object is a sport ball.

20. The orbit processor of claim 17 wherein at least one of the camera clusters incorporates a span of at least 10,000 horizontal pixels.

21. The orbit processor of claim 17 wherein the orbit processor is further adapted for calibrating the cameras in accordance with data relating to landmarks associated with the object.

22. The orbit processor of claim 17 wherein the processor includes at least one item of the group of items consisting of:
（A) a statistics generation module for accumulating data on the object state over time;
(B) an operator interface connected to a graphic user interface for a human operator, to a transceiver for communicating with the inertial navigation module, to the main processor unit, and to a broadcasting interface for outputting the object state;
(C) a display module for presenting the object state and object orbits; and
(D) a broadcasting interface for outputting the object state for external presentation.

23. A method for tracking a state of an object, the object state including at least a location of the object, images of the object being captured by two or more mutually displaced camera clusters, each camera cluster including one or more cameras, the method comprising:
(i) receiving data associated with the object state being provided by an inertial navigation module connected to the object;
(ii) determining the object state at certain time using data derived from images captured by the cameras; and
(iii) calculating subsequent object states using the determined object state at certain time as an initial state and using data received from said inertial navigation module to further follow the object state.

24. The method of claim 23 wherein the method further includes the step of communicating with said inertial navigation module using ZigBee specification.

25. The method of claim 23 wherein the method further includes the step of receiving data associated with the images of the object.

26. The method of claim 23 wherein a global positioning system module is connected to the object and the method further includes the step of using data provided by said global positioning system module for determining the object state at certain time.

27. The method of claim 23 wherein a micro-electromechanical altitude sensor and the method further includes the step of using object height data provided by said altitude sensor for controlling operation of other sensors.

28. The method of claim 23 wherein said calculating subsequent object states provides object location in a better than a 5 cm accuracy.

29. The method of claim 28 wherein said calculating subsequent object states provides object location in a better than a 1 cm accuracy.

30. The method of claim 23 wherein said calculating subsequent object states provides object state at a maximal repetition rate of at least 5 times per second.

31. The method of claim 30 wherein said calculating subsequent object states provides object state at a maximal repetition rate of at least 30 times per second.

32. The method of claim 23 wherein the method further includes the step of calibrating the cameras in accordance with known landmarks.

33. The method of claim 23 wherein the method further includes the step of accumulating statistical data on the object state over time.

34. The method of claim 23 wherein the method further includes the step of operating a graphic user interface for controlling a transceiver communicating with said inertial navigation module, the main processor unit, and the broadcasting interface for outputting the object state.

35. The method of claim 23 wherein the method further includes the step of presenting the object state and object orbits.

36. The method of claim 23 wherein the method further includes the step of outputting the object state for external presentation.

37. A method for a system embedded within a sport playing object, the system being associated with continuous determination of a state of the object, the object state including at least a location of the object, the method comprising:
(a) providing a first state module adapted for measuring one or more parameters associated with the object state said first state module being selected from a group of modules consisting of an inertial navigation module, a global positioning system and a micro-electromechanical altitude sensor;
(b) communicating said first state module to at least one wireless receiver;
(c) providing electric power to said first module and to at least one wireless transceiver communicating said first state module to at least one wireless transceiver; and
(d) switching said first state module in accordance with control signals.

38. The method of claim 37 wherein the system includes a rechargeable battery for providing electric power to at least said first state module and the method includes charging said rechargeable battery.

39. The method of claim 37 wherein the system includes providing data relating to said object state by a global positioning system module.

40. The method of claim 39 wherein the method includes transmitting signals to pseudolites for determining a location of the object.

41. The method of claim 37 wherein the method further includes using height data provided by a micro-electromechanical altitude sensor to control operation of the first state module.

42. The method of claim 37 wherein the method further includes transmitting to a wireless receiver acoustic signals provided by a microphone.

43. The method of claim 37 wherein the method further includes providing images reflecting a viewpoint of said object.

44. A system for embedment within a sport playing object, the system comprising:
(a) one or more sensors for providing signals received in proximity to the object wherein at least one of said one or more sensors being a microphone or a camera;
(b) a wireless transmitter for communicating said signals to at least one wireless receiver;
(c) a battery for providing electric power to said one or more sensors and to said at least one wireless transmitter; and
(d) a mounting module connecting said object with one or more sensors, the wireless transmitter and said battery, thereby the center of mass of the system being kept substantially at a predetermined position relative to the center of mass of the object.

45. The system of claim 44 wherein at least one of the sensors is a sensor selected from the group of sensors consisting of a microphone, and a camera.

46. A system for embedment within a playing object, the system comprising:
(a) an inertial navigation module adapted for measuring rotation rate of the object wherein said inertial navigation module being embedded within the object; and (b) an analysis unit adapted for analyzing said rotation rate in accordance with at least one predetermined operational criterion; and (c) a signal generator for emission of a signal in accordance with results of the analysis.

47. The system of claim 46 wherein said signal generator is a light emitting diode or an acoustic generator.

\* \* \* \* \*